Figure 3:
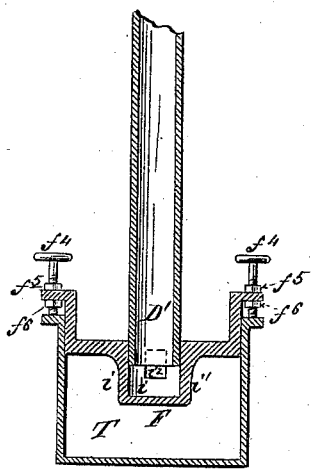

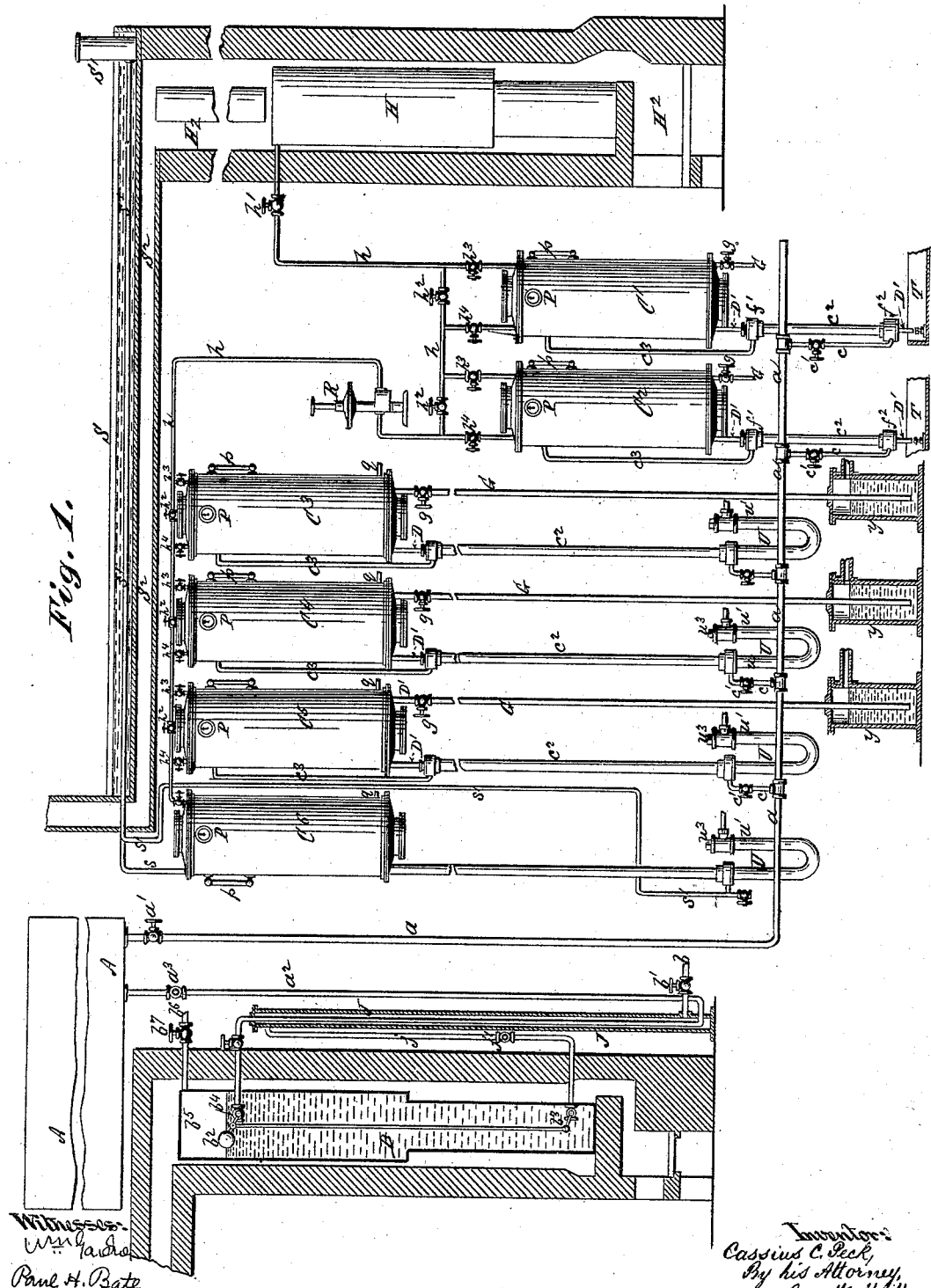

(No Model.) 3 Sheets—Sheet 2.

C. C. PECK.
DISTILLING OR CONCENTRATING LIQUIDS.

No. 329,073. Patented Oct. 27, 1885.

Witnesses:
Wm Gardner
Paul H. Bate

Inventor:
Cassius C. Peck,
By his Attorney
Geo. H. Watt

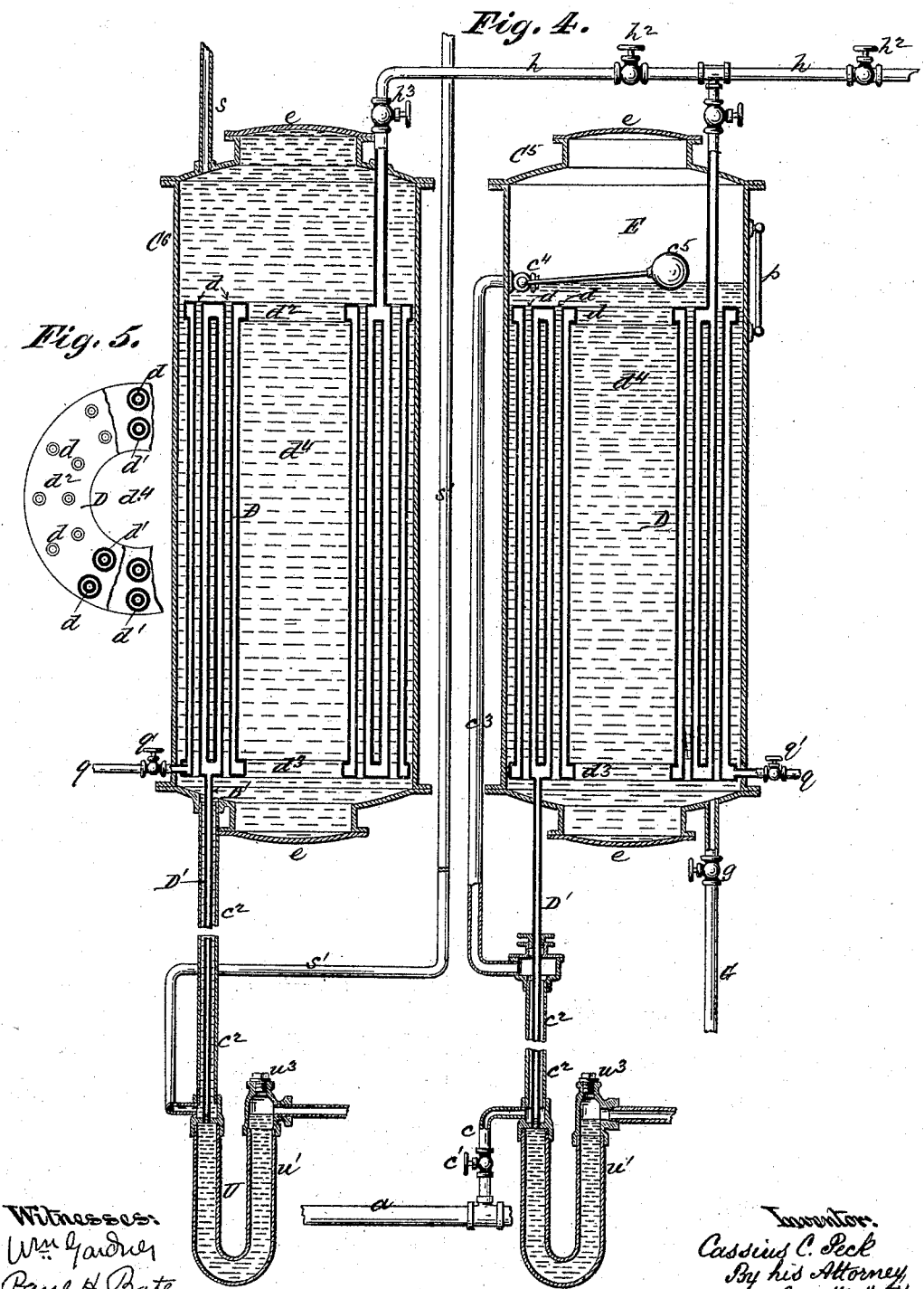

United States Patent Office.

CASSIUS C. PECK, OF NEW YORK, N. Y.

DISTILLING OR CONCENTRATING LIQUIDS.

SPECIFICATION forming part of Letters Patent No. 329,073, dated October 27, 1885.

Application filed June 29, 1885. Serial No. 170,107. (No model.)

*To all whom it may concern:*

Be it known that I, CASSIUS C. PECK, a citizen of the United States, residing in the city, county, and State of New York, have invented certain new and useful Improvements in Distilling or Concentrating Liquids; and I do hereby declare that the following is a full, clear, and exact description of the invention, which will enable others skilled in the art to which it appertains to make and use the same.

My improvements relate to the process for either distilling or concentrating liquids in which the heat primarily imparted to the condensing-liquid in the first of a series of closed condensing-chambers is designed to be used to vaporize such condensing-liquid, the vapor of which is condensed in a secondary condensing-chamber, thereby in turn evaporating the condensing-liquid contained therein, and so on continuously until the temperature has been reduced to a degree beyond which it cannot be further utilized profitably. The efficiency of such a system of continuous distillation or concentration of liquids is dependent on the degree in which the whole amount of caloric primarily imparted is utilized and rendered operative.

One feature of my invention consists in the process, herein described, of automatically removing the liquid of condensation from each low-pressure condenser without impairing the vacuum therein while simultaneously abstracting all excess of heat from such liquid and imparting the same to the condensing-liquid preparatory to its entrance into the evaporating-chamber.

I am aware that the liquid of condensation has heretofore been utilized for the purpose of heating the condensing-liquid; but in such cases the removal of the liquid of condensation has been effected by an excess of pressure in the condenser, which excess is liable at all times to cause the discharge of the liquid of condensation before it has fully imparted its excess of heat to the condensing-liquid, whereas by my process the liquid of condensation discharges itself slowly by gravity and finally escapes only after having been practically reduced to the lowest temperature of the feed of condensing-liquid.

In the process before referred to the discharge of the liquid of condensation is intermittent and irregular, whereas by my system it is rendered continuous and equal to the amount of condensation effected in the condenser. By thus practically utilizing all the caloric originally imparted to effect the first operation of distillation, no matter what such original temperature and pressure may be, except only that which escapes from the apparatus by radiation, I am enabled to materially increase the number of consecutive distillations and condensations which may be effected continuously and simultaneously in a single system. The relative temperatures of the condensing-liquids in adjoining condensing-chambers may thus be regulated so as to vary but slightly one from the other, decreasing progressively, for illustration, at the rate of, say, 2° or 3° in each succeeding condenser, so that it is practicable to effect thirty or more distinct and independent distillations by starting the process under pressure or above the boiling-point and continuing it below the boiling-point, or *in vacuo*, as hereinafter described.

Another feature of my invention consists in finally imparting all the heat remaining after the several consecutive distillations to the condensing-liquid used in the last chamber and utilizing it for the purpose of evaporating liquids under atmospheric pressure by means of a continuous closed circulation of water or other equivalent liquid. This feature, in conjunction with that of extracting the excess of heat from the liquids of distillation, enables me to utilize and render effective in work the full equivalent of the amount of heat primarily imparted to the apparatus to effect the first act of distillation, less only that small percentage which is necessarily lost by radiation, and which loss may be guarded against by proper and well-known means of insulation. A feature in this connection consists in automatically cooling the condensing-liquid in the last condenser by means of a gravity-circulation system, which also affords a convenient means of utilizing the heat for purposes of evaporating, as hereinbefore set forth.

In effecting the discharge of the liquid of condensation from the high-pressure condensers I pass such liquid in proximity to the incoming supply of condensing-liquid for a distance sufficient to enable the condensing-liquid to extract all excess of heat from the liquid of condensation; and to insure this result I regulate the discharge of the liquid of condensation from the lower extremity of the discharge-pipes automatically by utilizing the expansion or contraction of the discharge-pipes to control the discharge-openings, as hereinafter set forth.

As an additional precaution against the impairment of the vacuum, I elevate the temperature of the liquid to be treated (and which constitutes the condensing-liquid) to a degree sufficient to expel all air or gases therefrom, then recool the said liquid by passing it through the feed-liquid and introduce it into a reservoir common to all the condensers, the recooling, which is thus effected without loss of heat, being for the purpose of enabling such condensing-liquid to properly absorb all excess of heat contained in the liquid of condensation, as hereinafter more fully set forth.

My process is applicable not only to the distillation or concentration of a single liquid, but also to the simultaneous concentration or distillation of various liquids for different purposes—such as the fractional distillation of petroleum, alcohol, &c.—since each of the chambers, with its condenser, forms a complete and independent system in itself which may be connected with an independent source of supply.

My invention also includes the process herein set forth of utilizing practically all of the heat generated in the boiler-furnace by which the system is operated, except that necessarily lost by radiation, by imparting to the contents of an open evaporating-pan the surplus of heat remaining in the condensing-liquid after the last distillation and of the greater portion of the heat contained in the products of combustion as they pass from the furnace.

The accompanying drawings illustrate a system of apparatus suitable for carrying my improvements into effect. I do not, however, limit myself to any special construction of apparatus for such purpose, although I have made application for patent for a special construction, which application bears even date herewith.

It being therefore understood that various alterations and modifications may be made in the apparatus for carrying out my process without departing from the principle thereof, I will proceed, by way of illustration, to describe the operation of my invention in connection with the apparatus shown in the accompanying drawings, in which—

Figure 2:
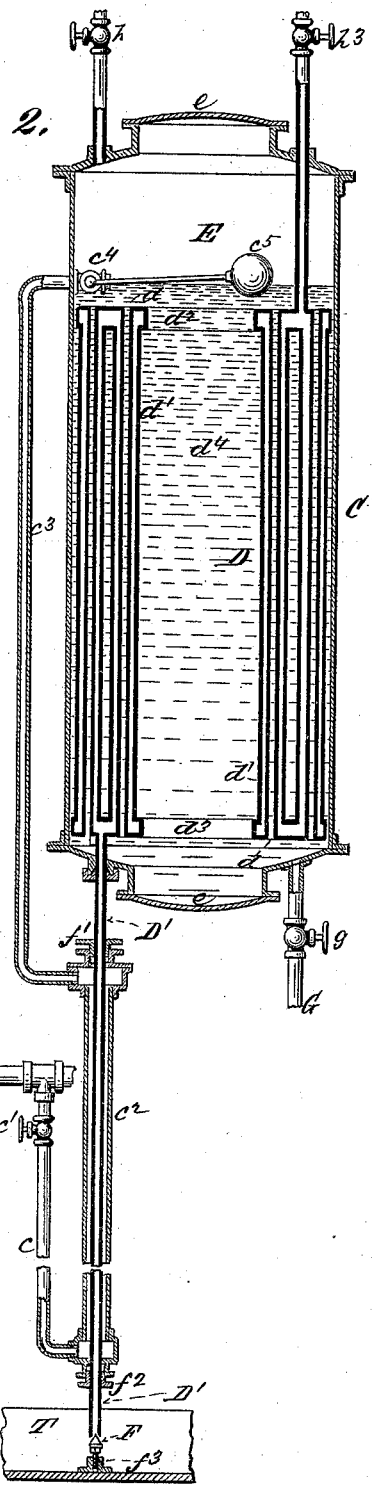

Figure 1 is a sectional elevation of a series of evaporating-chambers, &c., sufficient to illustrate the operation of my improvements, it being understood that any desired number of chambers may be combined in the system. Fig. 2 represents a vertical section of one of the high-pressure chambers and its connections; Fig. 3, a detail section of the stationary valve-seat for the discharge-pipe; Fig. 4, a central vertical section taken through the last two low-pressure chambers; Fig. 5, a top view of one of the chambers with parts broken away to show the arrangement of the condensing-surfaces.

The liquid to be treated is stored in an elevated reservoir, A, so as to cause it to flow through the service-pipe $a$ and into the chambers $C'$ $C^2$ $C^3$ $C^4$ $C^5$ $C^6$ by hydrostatic pressure. Where the nature of the liquid requires such treatment, it first passes through a boiler, B, which elevates its temperature sufficiently to expel all atmospheric gases, and then forces it upward into the reservoir A. The feed-liquid for the boiler B passes from the supply-pipe $b$, provided with the valve $b'$, into the lower end of the jacket J, from the upper extremity of which it is conducted by the pipe $j$, provided with the check-valve $j'$, into the lower part of the boiler B. The level of the liquid in the boiler B is maintained by a float, $b^2$, connected with both the inlet-valve $b^3$ and discharge-valve $b^4$, so that the supply and discharge will be equal. The discharge-valve $b^4$ is so situated near the upper extremity of the boiler as to leave a steam-space, $b^5$, above. The steam-space $b^5$ facilitates the collection and removal of the mixed gases and steam, which may be drawn off for use through the pipe $b^6$, provided with the valve $b^7$. The steam-pressure in the boiler B is utilized to force the liquid into the storage-tank A, from which latter it is conducted by the service-pipe $a$ to the several chambers $C'$ $C^2$ $C^3$ $C^4$ $C^5$ $C^6$. The pipe $a^2$, which connects the boiler B with tank A, is provided with a check-valve, $a^3$. The liquid is conveyed in each case from the service-pipe $a$ by means of a transfer-pipe, $c$, provided with a valve, $c'$, into the lower part of a vertical jacket, $c^2$, from the upper end of which it is conveyed to the upper part of the vaporizing-chamber by the pipe $c^3$, the inner end of which terminates in a valve, $c^4$, which is controlled by a float, $c^5$, by which means the level of liquid in the generators is automatically maintained at a suitable height above the surface-condenser D. Each evaporating-chamber C contains a surface-condenser, D, the space E above which may be designated as the "vapor-chamber." The surface-condensers D may be of any desired form, those shown in the drawings consisting of a series of vertical pipes, $d$ and $d'$, connected at opposite extremities to the annular drums or heads $d^2$ $d^3$. The interior pipes, $d$, pass through the exterior pipes, $d'$, and through both drums $d^2$ and $d^3$, while the exterior pipes, $d'$, communicate at both extremities with the interior of the drums. By this construction the condensing-surface is rendered as large as practicable within a given space, since the condensing-liquid not only surrounds the outer pipes, $d'$, but also circulates through the inner pipes, $d$. This construction will be understood by reference to Figs. 5 and 4. I am thus enabled to leave the central portion, $d^4$, of the condenser free and unobstructed without sacrifice of necessary condensing-surface. By thus leaving the central space, $b^4$, between the condensing-pipes open I facilitate the settling and deposition of solid matter which may be precipitated from the condensing-liquid, as the main circulation will occur around the sides of the chamber, leaving the central portion comparatively quiet. This construction also affords convenient access through the man-holes $e\ e$ for purposes of cleaning or repair. The liquid of condensation is conveyed from each surface-condenser D by a discharge-pipe, D', which passes through the jacket $c^2$, and deposits the liquid in a suitable receptacle. Each chamber C, except the last, $C^6$, is also provided with a pipe, G, for discharging the condensing-liquid, when desired, such pipe being provided with a valve, $g$, which is closed under ordinary circumstances.

The heat required for effecting the first distillation in the series is derived from the steam-boiler H, or other convenient source. The steam is conducted by the supply-pipe $h$, provided with the valve $h'$, into the surface-condenser D in the first evaporating-chamber, C'. The water of condensation is discharged through the pipe D', which passes through and is secured to the jacket $c^2$ by suitable flange-packings, $f'f^2$, at either extremity of the jacket. These packings allow an independent movement of pipe D' and jacket $c^2$, since, as the expansion of the pipe and jacket may not be exactly alike, it is desirable to provide for a slight difference in movement. During the alternate expansion and contraction of the discharge-pipe D' its lower end approaches or recedes with relation to a stationary valve seat or abutment, F, various forms of which may be designed. The essential feature in this connection of the parts with relation to each other is that the expansion of the discharge-pipe will contract the opening between its lower extremity and the said stationary seat, while its contraction will enlarge said opening, thereby regulating the discharge directly and positively by means of the temperature of the liquid. This is to guard against the escape of the water of condensation before it has fully imparted its excess of heat to the supply of liquid ascending through the jacket $c^2$ on its passage to the evaporating-chamber above.

As shown in the drawings, the valve-seat F may consist of a conical abutment (shown in Fig. 2) projecting more or less into the open lower end of the discharge-pipe, or, as shown in Fig. 3, of an external recess, $i$, into which the end of the discharge-pipe projects more or less, the side walls, $i'\ i'$, of the said recesses being formed with one or more slots or openings, $i^2$, which permit of the escape of the liquid. In any case, it is desirable to make the valve-seat F adjustable with relation to the end of the discharge-pipe. This may be accomplished in the case of the conical seat shown in Fig. 2 by threading its shank so that it may be adjusted within the standard or bearing $f^3$, which is formed with a female screw for this purpose; or where the exterior seat, F, is used it may be suspended between adjusting-screws $f^4$, which rest upon the sides of the trough T, or other stationary part of the apparatus, and are secured in the required position by set-nuts $f^5 f^6$.

It is obvious that other means of adjustment may be substituted without departing from my invention.

As the liquid of condensation descends through the discharge-pipe D' it is gradually cooled by the condensing-liquid which ascends through the jacket $c^2$, until, before its discharge at the lower end of pipe D', the said liquid of condensation has attained the temperature of the condensing-liquid as the latter enters the lower end of the jacket $c^2$. The pipe and jacket will be made of sufficient length to effect this result. At the same time the condensing-liquid in ascending will absorb heat from the liquid of condensation, and near the upper end of the jacket will be of about the same temperature as the liquid of condensation as the latter leaves the surface-condenser D. After having been thus heated to nearly the temperature of the liquid of condensation the condensing-liquid passses upward into the chamber C, to be in turn vaporized and conveyed by the connecting-pipe $h$, into the surface-condenser situated within the next evaporating chamber, $C^2$, in which chamber the operation is repeated, and so on continuously from one evaporating-chamber to the next succeeding, to the end of the series, the only difference being that in connection with the vacuum-chambers the automatic discharging devices are somewhat modified in construction in order to preserve the vacuum therein, as hereinafter described.

Any desired number of the high-pressure condensers may be combined and used together, or in connection with a suitable number of low-pressure or vacuum condensers. The connecting-pipe $h$, which conveys the vapor over from the last high-pressure chamber, $C^2$, to the succeeding low-pressure condenser contained in chamber $C^3$, is provided with a pressure-regulator, R, of any ordinary and well-known form to prevent the possibility of the vapor going over at a pressure which would destroy the vacuum in the low-pressure chamber $C^3$. After passing through the regulator R the vapor enters the surface-condenser D, and in condensing imparts its excess of heat to the condensing-liquid in the same manner as before; but the liquid of condensation passes into a sealed U-shaped reservoir, which is of sufficient capacity to contain a quantity of liquid equivalent to that which would fill the discharge-pipe D', which latter is of such length that, taken in conjunction with the height of the U-reservoir, it constitutes a Torricellian column which seals the vacuum in the surface-condenser D above and in the vapor-chamber E in the last preceding chamber. Were the vacuum perfect in the condensers, it could not overcome the column of liquid in pipes D′, so as to allow air to enter the chambers and destroy the vacuum. A column of liquid will rise in pipes D′ in exact proportion to the amount of vacuum in the surface-condenser D and vapor-chamber E, and the discharge of the liquid of condensation will be continuous from the leg $u'$ of the pipe U so long as liquid is collected in the condensers.

For liquids of lighter weight it is obvious that the pipes D′ should be proportionately longer, and for liquids of greater specific gravity shorter pipes may be used. Also, as there would never be a perfect vacuum in the condensers, it is necessary in practice to have the discharge-pipes only of sufficient length to overcome the greatest amount of vacuum which the special conditions of use show to be necessary. From the short leg of the U-reservoir the liquid of condensation is conveyed away by suitable pipes. For the sake of simplicity in the drawings, only six condensers are shown, but ordinarily more than that number would be incorporated into the system. The condensation of the vapor in the last chamber, $C^6$, is effected by an independent and continuous circulation of a condensing-liquid, preferably water, through the chamber and through a system of pipes which are exposed to the cooling action of a liquid contained in a separate tank or reservoir, S. This cooling-liquid contained in the separate tank may consist of liquid to be evaporated in an open pan under atmospheric pressure, in which case the heat imparted to the condensing-liquid in effecting the last condensation in the series is utilized to evaporate the liquid in the pan. The last chamber, which becomes simply a condensing-chamber, is maintained constantly full of the condensing-liquid by means of hydrostatic pressure, and a constant circulation is maintained by arranging the exit-pipe $s$ at the top of the condensing-chamber and the inlet-pipe $s'$ at the lower end of the said chamber, which arrangement acts to produce a constant circulation of the condensing-liquid. An expansion-chamber, S′, is introduced in the system of pipes $s\ s'$ for the purpose of compensating for any alteration in the bulk of the condensing-liquid contained in the closed circulation. The coil $s\ s'$ has sufficient surface exposed to the liquid in pan, and the pan sufficient surface exposed to the air, to convey away the amount of heat necessary for reducing the temperature to the desired extent in the last reservoir. By exposing a much larger radiating coil-surface to the atmosphere the evaporating-pan can be dispensed with. Each of the chambers is provided with a vacuum or pressure gage, P, and with the usual glass liquid-level gages, $p$. Suitable means are provided, as by the pipes $q$, having valves $q'$, for connecting the interior of the surface-condensers D with an exhaust pump or pumps for withdrawing the air preparatory to commencing the operation. Each evaporating-chamber is also provided with a pipe, G, and valve $g$ for effecting the discharge of the liquid contained therein when desired. The lower extremities of the discharge-pipes G attached to the vacuum-condensers enter suitable tanks or receptacles, $y$, of sufficient capacity to contain a quantity of fluid at least as large as that which is required to fill the discharge-pipes G, which latter are of sufficient length to maintain the vacuum in the cylinders, as before described in connection with the pipes D′.

I design in some cases to convey the liquid of condensation from each condenser directly to the evaporating-pan S, for the purpose of finishing the process of concentration or precipitation. When the liquid of condensation from a number of condensers is thus conveyed to the evaporating-pan S, the accumulation of such liquid will be rapid, and a comparatively large surface of pan will be required and more heat needed than will be derived from the closed circulation through the pipes $s\ s'$, condenser $C^6$, &c., in order to insure as far as possible the evaporation of the liquid in the pan at an equal rate with that effected in the several chambers C. I pass the products of combustion escaping from the boiler-furnace $H^2$ through a shallow wide flue, $S^2$, extending underneath the whole length of the evaporating-pan. It will thus be seen that practically all the heat generated within the furnace $H^2$ is utilized in performing work, except the percentage necessarily lost by radiation and that which escapes from under the evaporating-pan.

In charging my apparatus for use I fill the last condensing-chamber, $C^6$, and the system of pipes $s\ s'$ through the expansion-tank S. The other chambers, C, are charged by opening their individual inlet-valves $c'$ so that liquid may enter from the supply pipe or pipes $a$, connected with one or more elevated reservoirs, A. In the drawings but a single reservoir A, and supply-pipe $a$ are shown; but where different liquids are under simultaneous treatment independent reservoirs and supply-pipes will be provided for each liquid. In any case the valves $c'$ and the main valve $a'$ being opened, the liquid rises through the pipes $c\ c^2\ c^3$ into all the evaporating-chambers (except the last one, $C^6$) until the proper level is attained, and the floats $c^5$ close the valves $c^4$, the air displaced during this operation escaping from the apparatus through the discharge-pipes D′. The plugs $u^3$ in the discharge ends of the U-reservoirs U are then removed, and the said reservoirs filled to the desired level. The valves $q'$ in the pipes $q$, connecting with the vacuum-pumps, are next opened, and the pumps operated until the desired degree of vacuum is indicated by the gages P, when the valves $q'$ are again closed. The cooling-liquid or liquid to be evaporated is supplied to the evaporating-pan S. Steam may now be admitted to the first condenser D by opening the valve $h'$ in the steam-pipe $h$, connected with the boiler H, when the operation will proceed continuously and automatically throughout the entire system, as hereinbefore set forth, provided the valves $h^3$ $h^4$ are open and valve $h^2$ closed. By closing the valves $h^3$ $h^4$ any one or more of the chambers C can be cut off, while the operation proceeds in the rest of the series, the intermediate valves, $h^2$, being opened. Before discharging the liquid contained in the chambers C' C², &c., the tanks $y$ are filled to the proper level with a sufficient quantity of liquid of the same character.

The vaporizing-chambers and all connecting-pipes are insulated with respect to heat as perfectly as possible by sheathing with asbestus, hair felt, mineral wool, or other good non-conductors, to the end that the smallest possible amount of caloric be lost by radiation.

What I claim as my invention, and desire to secure by Letters Patent, is—

1. In a continuous system of distillation or evaporation, substantially such as described, the process herein set forth of simultaneously and automatically effecting the heating of the feed condensing-liquid, the discharge of the liquid of condensation by gravity, and the preservation of the vacuum within the condenser, for the purpose and substantially as described.

2. In a continuous system of distillation or evaporation, substantially such as described, the process herein described of lowering the temperature of the condensing-liquid by establishing a gravity-circulation of the liquid through the evaporating-chamber and through a coil or series of elevated cooling-pipes, substantially in the manner and for the purposes described.

3. In a continuous system of distillation or evaporation, substantially such as described, the process herein described of utilizing the heat imparted to the condensing-liquid during the process of condensation, consisting in establishing a circulation of the said condensing-liquid through the evaporating-chamber and through a coil or series of elevated pipes contained in an open evaporating-pan, substantially in the manner and for the purpose described.

4. In a continuous system of distillation or evaporation, substantially such as herein designated, the process herein described of preserving the vacuum in the low-pressure condensing and evaporating chambers, consisting in first eliminating the air and gases by heat from the liquid to be treated, and then recooling said liquid by causing it to impart its excess of heat to a fresh supply of such liquid, for the purpose and substantially in the manner described.

5. In combination with a continuous system of distillation or evaporation, substantially such as described, the process herein described of economizing the heat generated in the actuating-boiler furnace, which consists in utilizing the heat of the steam to effect a series of evaporations in separate chambers, and conveying the surplus or remaining heat which is absorbed by the liquid of condensation in the last evaporating-chamber into an open evaporating-pan, under which the products of combustion from the said boiler-furnace are made to pass, substantially in the manner described.

CASSIUS C. PECK.

Witnesses:
WM. GARDNER,
GEO. W. MIATT.